United States Patent
Yoshikawa et al.

(10) Patent No.: US 10,626,246 B2
(45) Date of Patent: Apr. 21, 2020

(54) POLYLACTIC ACID COMPOSITION

(71) Applicant: TOYO SEIKAN GROUP HOLDINGS, LTD., Tokyo (JP)

(72) Inventors: Seishi Yoshikawa, Yokohama (JP); Toshiki Yamada, Yokohama (JP); Tsutaki Katayama, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/124,749

(22) PCT Filed: Feb. 17, 2015

(86) PCT No.: PCT/JP2015/054293
§ 371 (c)(1),
(2) Date: Sep. 9, 2016

(87) PCT Pub. No.: WO2015/137058
PCT Pub. Date: Sep. 17, 2015

(65) Prior Publication Data
US 2017/0015806 A1 Jan. 19, 2017

(30) Foreign Application Priority Data
Mar. 11, 2014 (JP) ................. 2014-047835

(51) Int. Cl.
| | | |
|---|---|---|
| C08K 3/34 | (2006.01) | |
| C08K 9/04 | (2006.01) | |
| C08L 67/04 | (2006.01) | |
| C08L 5/00 | (2006.01) | |
| C08L 1/02 | (2006.01) | |
| C08L 3/02 | (2006.01) | |
| C08K 5/098 | (2006.01) | |
| C09K 8/035 | (2006.01) | |
| C09K 8/62 | (2006.01) | |

(52) U.S. Cl.
CPC ............. *C08K 3/34* (2013.01); *C08K 3/346* (2013.01); *C08K 5/098* (2013.01); *C08K 9/04* (2013.01); *C08L 1/02* (2013.01); *C08L 3/02* (2013.01); *C08L 5/00* (2013.01); *C08L 67/04* (2013.01); *C09K 8/035* (2013.01); *C09K 8/62* (2013.01); *C08K 2201/018* (2013.01); *C08L 2201/06* (2013.01)

(58) Field of Classification Search
None
See application file for complete search history.

(56) References Cited

U.S. PATENT DOCUMENTS

| | | | |
|---|---|---|---|
| 7,833,950 B2 | 11/2010 | Willberg et al. | |
| 2005/0161220 A1 | 7/2005 | Todd et al. | |
| 2005/0205265 A1 | 9/2005 | Todd et al. | |
| 2006/0283591 A1 | 12/2006 | Willberg et al. | |
| 2007/0032577 A1 | 2/2007 | Kanzawa et al. | |
| 2007/0204997 A1 | 9/2007 | Harris et al. | |
| 2008/0069993 A1 | 3/2008 | Kawahara et al. | |
| 2008/0108742 A1 | 5/2008 | Miyamoto et al. | |
| 2009/0018237 A1 | 1/2009 | Fujii et al. | |
| 2010/0056402 A1 | 3/2010 | Li et al. | |
| 2010/0076133 A1 | 3/2010 | Yamaguchi | |
| 2011/0237710 A1* | 9/2011 | Serpelloni | C08J 3/05 523/351 |
| 2012/0160478 A1 | 6/2012 | Todd et al. | |
| 2013/0081821 A1 | 4/2013 | Liang et al. | |
| 2013/0168096 A1 | 7/2013 | Parkhonyuk et al. | |
| 2013/0192839 A1 | 8/2013 | Brown et al. | |
| 2016/0060506 A1 | 3/2016 | Takahashi et al. | |

FOREIGN PATENT DOCUMENTS

| | | |
|---|---|---|
| CN | 1768115 A | 5/2006 |
| CN | 1953911 A | 4/2007 |
| CN | 101023132 A | 8/2007 |
| CN | 101273183 A | 9/2008 |
| CN | 102859111 A | 1/2013 |
| EA | 008140 B1 | 4/2007 |
| EA | 014811 B1 | 2/2011 |
| JP | 3831278 B2 | 10/2006 |
| JP | 2007-197602 A | 8/2007 |
| JP | 2009-263539 A | 11/2009 |
| JP | 2011-016944 A | 1/2011 |
| JP | 5093834 B2 | 12/2012 |
| JP | 2013-100553 A | 5/2013 |
| JP | 2013-245262 A | 12/2013 |
| RU | 2 369 626 C2 | 10/2009 |
| RU | 2 373 250 C2 | 11/2009 |
| RU | 2011 154 343 A | 7/2013 |
| WO | 2013/052285 A1 | 4/2013 |
| WO | 2014/162793 A1 | 10/2014 |

OTHER PUBLICATIONS

Chang et al. Polymer 44 (2003) 3715-3720.*
Communication dated Mar. 21, 2017, from the State Intellectual Property Office of the P.R.C. in counterpart Chinese application No. 201580013514.3.
High Polymer Material Handbook, 2009, pp. 838-841 (5 pages).
International Search Report for PCT/JP2015/054293 dated May 19, 2015.
Communication dated Nov. 6, 2018 from the State Intellectual Property Office of the P.R.C. in counterpart Application No. 201710660883.2.

* cited by examiner

*Primary Examiner* — Robert T Butcher
(74) *Attorney, Agent, or Firm* — Sughrue Mion, PLLC

(57) ABSTRACT

A polylactic acid composition of a dispersion structure using, as a matrix, a lowly crystalline or amorphous polylactic acid having a crystallinity of not more than 40%, the matrix containing, as a pulverization promotor dispersed therein, an organically modified polysaccharide or a lamellar silicate that is swollen or that is treated to be swollen.
The polylactic acid composition has excellent hydrolysable capability and property of being mechanically pulverized.

9 Claims, 2 Drawing Sheets

POLYLACTIC ACID COMPOSITION

TECHNICAL FIELD

This invention relates to a polylactic acid composition obtained by blending a polylactic acid with a fracture promotor.

BACKGROUND ART

The polylactic acid has been known as a resin having excellent biodegradable property. From the standpoint of improving environments, study has now been forwarded in an attempt to use the polylactic acid to substitute for various plastic materials used in various fields of applications. The polylactic acid has now been put into practical use in some fields of applications.

Recently, furthermore, it has been proposed to use the polylactic acid as a dispersion solution for drilling for extracting underground resources (see patent document 1).

To extract underground resources, for example, there has now been widely employed an ore chute drilling method called hydraulic fracturing method. The hydraulic fracturing method consists of pressurizing the fluid filled in the ore chute to form cracks (fractures) in the vicinities of the ore chute to thereby improve permeability in the vicinities of the ore chute (for easy flow of the fluid) in an attempt to increase the effective sectional area through which the resources such as oils and gases flow into the ore chute and, therefore, in order to improve productivity of the ore chute. The fluid is also called fracturing fluid. So far, a viscous fluid like jelly gasoline was used. Recently, however, as the shale gas or the like gas has now been extracted from the shale layer that exists in relatively shallow places and by taking the effects on the environment into consideration, it is becoming a common practice to use an aqueous dispersion solution obtained by dissolving or dispersing a polymer in water. As such a polymer, there has been proposed the polylactic acid.

That is, the polylactic acid is a substance that exhibits hydrolysable capability and biodegradable capability, and, even if it remains under the ground, is decomposed by water or enzyme in the ground and does not adversely affect the environment. Further, the water that is used as a dispersant, too, can be considered to be far from affecting the environment as compared to gasoline or the like.

Further, the ore chute is filled with the aqueous solution in which the polylactic acid is dispersed and the aqueous solution is pressurized so that the polylactic acid permeates into the vicinities of the ore chute. Here, the polylactic acid undergoes the hydrolysis and loses the form of the resin. Therefore, spaces (or cracks) form in the portions where the polylactic acid has permeated accounting for an increase in the space of the ore chute into which the resources can flow.

Here, the polylactic acid is of such a nature that it cannot be easily atomized. For being atomized, the polylactic acid just produced must be subjected to the pulverization and classification (mesh passing) repetitively resulting in an increase in the cost.

Besides, the polylactic acid used for the dispersion solution for drilling must be hydrolyzed. At present, however, the polylactic acid has not almost been studied concerning its pulverizability and hydrolysable capability.

For instance, a patent document 2 discloses a biodegradable resin composition (polylactic acid composition) containing a polylactic acid of which D-isomer content is not more than 2% by mass and a lamellar silicic acid. This polylactic acid composition was developed to improve the heat resistance and the mechanical properties. However, no study has been forwarded yet concerning its pulverizability and hydrolysable capability. In fact, according to the study conducted by the present inventors, the polylactic acid composition of the patent document 2 has a low hydrolysable capability.

Further, a patent document 3 discloses a powder comprising a polylactic acid that has a crystallinity of not less than 30%. The polylactic acid can be mechanically pulverized excellently and can be atomized. However, its hydrolysable capability has not been studied at all.

Prior Art Documents

Patent Documents

Patent document 1: U.S. Pat. No. 7,833,950
Patent document 2: Japanese Patent No. 3831278
Patent document 3: Japanese Patent No. 5093834

Outline of the Invention

Problems that the Invention is to Solve

It is, therefore, an object of the present invention to provide a polylactic acid composition having excellent hydrolysable capability and property of being mechanically pulverized.

Another object of the present invention is to provide a polylactic acid composition used for the preparation of an aqueous dispersion solution for drilling, such as fracturing fluid.

Means for Solving the Problems

According to the present invention, there is provided a polylactic acid composition of a dispersion structure using, as a matrix, a lowly crystalline or amorphous polylactic acid having a crystallinity of not more than 40%, the matrix containing, as a pulverization promotor dispersed therein, an organically modified polysaccharide or a lamellar silicate that is swollen or that is treated to be swollen.

In the polylactic acid composition of the present invention, it is desired that:
(1) As the polylactic acid, use is made of a DL-isomer in which an L-isomer and a D-isomer are contained at a weight ratio (LID) in a range of 98/2 to 2/98;
(2) The polylactic acid composition assumes the granular form having a grain size of not more than 1000 μm and, specifically, not more than 300 μm;
(3) The pulverization promotor is contained in an amount of 1 to 10 parts by weight per 100 parts by weight of the polylactic acid;
(4) As the lamellar silicate that is the pulverization promotor, use is made of a montmorillonite in which organic cations are introduced or a synthetic mica; and
(5) The polylactic acid composition is used for the preparation of an aqueous dispersion solution for drilling.

Effects of the Invention

The polylactic acid composition of the present invention does not impair hydrolysable capability of the polylactic acid. More than that, the polylactic acid composition works to promote the hydrolysable capability and exhibits excellent pulverizablity, and can be atomized by the mechanical pulverization (e.g., freeze pulverization or normal-temperature pulverization). As demonstrated in Examples appearing later, the polylactic acid composition can be obtained in the form of fine granules in an yield of not less than 15% through the mechanical pulverization of one pass, the fine granules having a mesh-pass grain size of not larger than 300 μm. It is, therefore, made possible to prepare an aqueous dispersion of the polylactic acid meeting the required hydrolysable capability at low costs. The polylactic acid composition can, therefore, be favorably used for the preparation of an aqueous dispersion for drilling.

MODES FOR CARRYING OUT THE INVENTION

Figure 1:
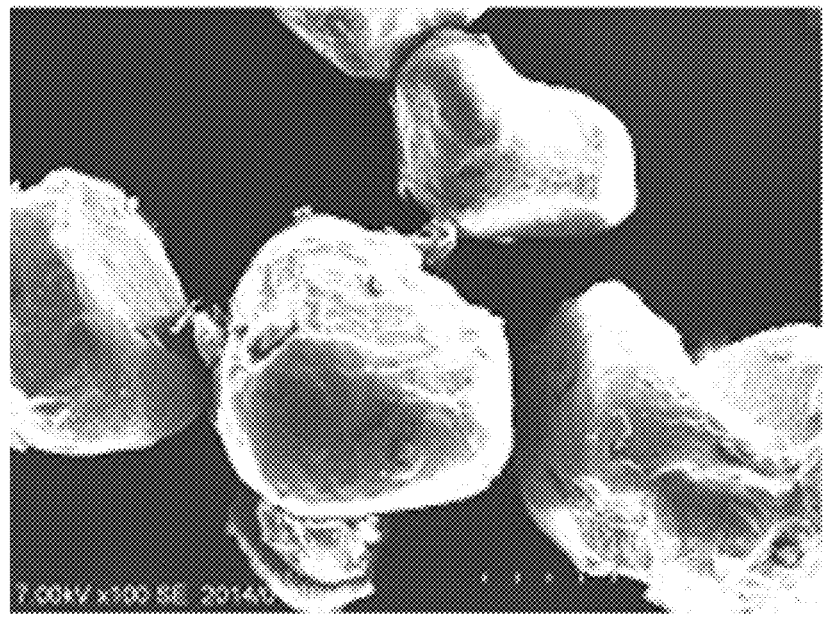
FIG. 1 is an SEM photograph (magnification of 100 times) showing granules obtained by pulverizing, at normal temperature, a polylactic acid composition of the present invention prepared in Example 2.

The polylactic acid composition of the present invention has a dispersion structure, wherein a matrix of the polylactic acid contains a pulverization promotor dispersed therein. When subjected to the mechanical pulverization, therefore, destruction takes place on the interface between the pulverization promotor and the polylactic acid. As a result, the polylactic acid composition can be efficiently atomized by the mechanical pulverization.

1. Polylactic Acid;

In the present invention, it is important that the polylactic acid that constitutes the matrix has a crystallinity of not more than 40%.

That is, the polylactic acid having a crystallinity larger than the above exhibits a low hydrolysable capability. For instance, as shown in Examples appearing later, if an aqueous dispersion solution in which the composition thereof is dispersed is left to stand for 7 days at a predetermined temperature, then the polylactic acid maintains its weight average molecular weight Mw at a very high ratio which is close to, for example, 50%. On the other hand, if there is used a lowly crystalline or amorphous polylactic acid having a crystallinity lying within the above range, the weight average molecular weight Mw thereof is held at a ratio of as very low as about not more than 25%; i.e., a high hydrolysable capability is exhibited.

Here, however, the pulverizability tends to decrease with a decrease in the crystallinity in the present invention, therefore, it is desired that the polylactic acid has a crystallinity in a range of 1 to 40% and, specifically, 1 to 30% to realize both hydrolysable capability and pulverizability.

In the invention, from the quantity of heat of crystal fusion, 93.6 (J/g), of when the polylactic acid is crystallized by 100% and from the fusion enthalpy ΔHm and the crystallization enthalpy ΔHc of the polylactic acid found by the DSC measurement, the crystallinity Xc (%) of the polylactic acid is found from the following formula;

$$Xc(\%) = (\Delta Hm - \Delta Hc) \times 100/93.6$$

In the present invention, if the above lowly crystalline or amorphous polylactic acid is used as the matrix, it is desired that the polylactic acid that is used is a DL-isomer which comprises an L-isomer and a D-isomer at a weight ratio (L/D) in a range of 98/2 to 2/98. That is, the poly L-lactic acid containing the D-isomer in a very small amount (e.g., in an amount of less than 2% by weight) is highly crystalline, and tends to be easily crystallized by the thermal hysteresis of when a pulverization promotor that will be descried later and the polylactic acid are kneaded together. It is, therefore, probable that the crystallinity of the polylactic acid that constitutes the matrix becomes larger than the above-mentioned range and, therefore, the hydrolysable capability decreases.

The above polylactic acid can be used being blended with any other resin in a small amount (e.g., not more than 5 parts by weight per 100 parts by weight of the polylactic acid) so far as the mechanical pulverizability and the hydrolyzable capability of the invention are not impaired. By being blended with, for example, a small amount of polyethylene oxalate (PEOx) that has hydrolysable capability larger than that of the polylactic acid and that releases such an acid as oxalic acid upon the hydrolysis, the polylactic acid exhibits an increased hydrolysable capability.

2. Pulverization Promotor;

In the present invention, the pulverization promotor dispersed in the matrix of the polylactic acid is a highly hard material, and is, concretely, an organically modified polysaccharide or a lamellar silicate that is swollen or that is treated to be swollen. That is, with the pulverization promotor being used, the breakage quickly proceeds in the interface between the two when the composition is subjected to the mechanical pulverization; i.e., the mechanical pulverizability is greatly improved.

In the present invention, the polysaccharide is the one made up of monosaccharides such as starches, cellulose, agar-agar, glycogen and the like that are linked together by a glycoside bond. The polysaccharide that is organically modified is used as the pulverization promotor. The organic modification is executed by reacting, for example, an acetic acid or a fatty acid with the OH in the polysaccharide.

As the organically modified polysaccharide, it is desired to use, specifically, a cellulose derivative and, most desirably, a cellulose CP (cellulose propionate) from Such a standpoint that it is inexpensively and easily available, and that it highly effectively improves the pulverizability.

The lamellar silicate is a mineral having a structure in which the layers are stacked one upon the other, and is called montmorillonite or mica group clay mineral.

The montmorillonite has, as its basic structure, a three-layer structure comprising $SiO_4$ tetrahedral layer —$AlO_6$ octahedral layer —$SiO_4$ tetrahedral layer, and is an aggregate of tiny single crystals in which several pieces of the above three-layer structures are stacked one upon the other. Among the layers of the stack of these three-layer structures, there are present cations such as Ca, K, Na and the like and water molecules coordinated thereon. Examples are acid clay, bentonite, and active clay treated with an acid to such a degree that the three-layer structures are not extinguished. Mica group clay minerals, on the other hand, are lamellar silicate minerals having a cleavable laminated granular structure, such as mica, vermiculite and the like.

In the present invention, the lamellar silicate that is swollen or that is treated to be swollen can also be used as the pulverization promotor.

For example, the montmorillonite is treated to swell by introducing organic cations into among the layers also the stack of the basic three-layer structures. That is, by exchanging cations such as Na and Ca present among the layers with organic cations, the organic cations are introduced into among the layers, and there is thus formed a structure having a wide gap among the basic three layers or a state in which the stacked structures are not oriented. If the thus treated montmorillonite is kneaded with the above polylactic acid, the polylactic acid infiltrates into spaces among the basic three-layer structures. There is thus realized a matrix of the polylactic acid in which the montmorillonite is finely dispersed. As the organic cations used for the swelling treatment, there can be exemplified primary amine salts such as octylamine and dodecylamine; secondary amine salts such as dioctylamine and the like; tertiary amine salts such as trioctylamine and the like; and quaternary ammoniums such as tetrabutylammonium, octadecyltrimethylammonium and the like. There can be, further, used a phosphonium salt such as tetraethylphosphonium. The swelling treatment can be easily conducted by dipping the lamellar silicate in a solution obtained by dissolving or dispersing the organic cations in an organic solvent or in an aqueous solvent.

The mica group mineral such as mica or vermiculite may have been treated as described above. Usually, however, the synthetic mica that is treated to be swollen is used as the pulverization promotor. The swelling treatment is conducted by either a chemical swelling means or a thermal swelling means. The chemical swelling means treats the mineral with oxygen peroxide and an acid whereas the thermal swelling means treats the mineral by heating it at a temperature of 600 to 1000° C. Through the swelling treatment, the gaps are expanded among the cleavable granules; i.e., the volume can be expanded to about 5 to about 50 times as great.

In the invention, the treatment for swelling or the treatment for expanding volume can be confirmed from the distance among the layers of not less than 1 nm as calculated from a diffraction peak stemming from the plane [001] of the lamellar silicate by using the XRD.

The above treatment, further, effectively suppresses the foaming caused by the adsorption of moisture of when the lamellar silicate is mixed with the polylactic acid. Namely, the lamellar silicate can be homogeneously and finely dispersed in the matrix of the polylactic acid.

The lamellar silicate treated above can be, further, treated for its surfaces with a silane coupling agent, a fatty acid such as stearic acid, palmitic acid or lauric acid, or a Ca salt, Zn salt, Mg salt or Ba salt of these fatty acids to improve dispersion property thereof in the polylactic acid.

In the present invention, it is desired to use the lamellar silicate mineral that has been treated to be swollen from the standpoint of attaining a high hardness, an increased contact area with the polylactic acid, enabling the contacting interface to be quickly destroyed when a mechanical pressure is applied, and greatly improving the pulverizability.

It is desired that the pulverization promotor is used in an amount of 1 to 10 parts by weight and, specifically, 1 to 5 parts by weight per 100 parts by weight of the polylactic acid. By using the pulverization promotor in such an amount, it is made possible to improve the pulverizability of the polylactic acid without impairing its hydrolysable capability. Besides, when subjected to the mechanical pulverization, the polylactic acid composition assumes a spherical shape of which, for example, a ratio of the smallest diameter and the largest diameter is close to 1 which is not less than 0.5. Namely, voids are reduced lending the polylactic acid composition to be packed in a packing bag, i.e., to be advantageously packed. At the time of extracting the underground resources, further, the polylactic acid composition can be mixed with the proppants and permeates into the fractures more easily. For instance, if the amount of the pulverization promotor is smaller than the above range, the pulverizability is improved less. On the other hand, despite the pulverization promotor is used in amounts larger than the above range, no further improved pulverizability is expected. Besides, cost increases. Moreover, the polylactic acid exhibits decreased hydrolysable capability and, when pulverized, assumes a shape that is far from the spherical shape, causing inconvenience such as it can be packed in a bag less efficiently.

3. Production of the Polylactic Acid Composition;

The above-mentioned polylactic acid composition of the present invention is obtained by melting and kneading the polylactic acid and the pulverization promotor together at a temperature not lower than a melting point of the polylactic acid. Dispersion of the lamellar silicate can be confirmed from a distance among the layers of not less than 2 nm that is calculated from diffraction peaks due to the plane [001] of the lamellar silicate as measured by the XRD or can be confirmed from the extinction of the diffraction peaks. There can be, further, added an amphipathic substance such as magnesium stearate, polar wax or plant oil in order to improve dispersion property. The above polylactic acid composition has property of being mechanically pulverized very favorably and can, therefore, be mechanically pulverized in a state of being frozen or at normal temperature followed by classification using meshes. The polylactic acid composition can, therefore, be used in a fine granular form having a suitable degree of grain size such as not more than 1000 µm and, specifically, not more than 300 µm. Through the pulverization treatment conducted for short periods of time and through the classification treatment of a small number of times of mesh passing, therefore, there is obtained the polylactic acid composition having a desired grain size in a high yield maintaining a very high productivity.

Prior to the above pulverization treatment or the classification treatment, further, the crystallization treatment can be conducted by being suitably heated (e.g., by being heat-treated at 80 to 120° C. for about 1 to about 6 hours) to adjust the crystallinity to lie in the above-mentioned preferred range (1 to 40%) in order to improve the hydrolysable capability.

4. Use;

The polylactic acid composition of the present invention can be mechanically pulverized very favorably and can be easily turned into a fine granular form without impairing a high degree of hydrolysable capability of the polylactic acid. The polylactic acid composition in its fine granular form, therefore, is easy to handle and can be dispersed in water to favorably use it as a dispersion solution for drilling, such as fracturing fluid used in the site of extracting underground resources.

In preparing the dispersion solution for drilling, the polylactic acid composition is thrown into water in an amount of, usually, 0.01 to 20% by weight of the polylactic acid and, specifically, 0.01 to 10% by weight of the polylactic acid, in the dispersion solution. Use of the dispersion solution enables the ore chute drilling and the hydraulic fracturing to be smoothly executed.

EXAMPLES

Excellent effects of the invention will now be described by way of the following Experimental Examples.

Described below are the polylactic acids (PLA), kinds of the blending agents, preparation of sample pellets and evaluation of the properties employed in the Experiments.

Polylactic Acids (PLA);

Polylactic acid, Revode 101, produced by ZHEJIANG HISUN BIOMATERIALS CO., LTD.
- D-isomer content: 4%
- Melting point: 155° C.
- Weight average molecular weight (Mw): 200,000

Polylactic acid, Revode 190, produced by ZHEJIANG HISUN BIOMATERIALS CO., LTD.
- D-isomer content: 0.3%
- Melting point: 179° C.
- Weight average molecular weight (NV): 200,000

Blending Agents;
- Synthetic mica treated to be swollen
- Montmorillonite treated to be swollen
- Untreated montmorillonite
- Magnesium stearate
- Modified cellulose (cellulose CP)
- Unmodified cellulose
- Calcium carbonate
- Polyethylene oxalate (POx)
  - Melting point: 180° C.
  - Weight average molecular weight: 70,000

Preparation of Sample Pellets;

By using a biaxial extruder (ULT Nano 05-20AG manufactured by Technobell Co.), the polylactic acids and blending agents were dry-blended, and melted and mixed together at 200° C. to prepare master pellets.

The powdery materials such as montmorillonite, synthetic mica, calcium carbonate and cellulose were thrown in by using a powder feeder.

The obtained pellets were heated at 120° C. for 4 hours so as to be crystallized.

Mechanical Pulverizability;

As for the freeze pulverizability, the sample pellets were frozen for 15 minutes and were pulverized for 5 minutes by using a ball-type freeze pulverizer. The obtained powder was passed through a mesh of a perforation size of 300 μm, and the ratio of the powder that has passed through the mesh in one time was found. A higher ratio of pass represents more excellent mechanical pulverizability.

As for the pulverizability at normal temperature, the sample pellets were thrown into a normal-temperature pulverizer IME-800DG manufactured by Iwatani Sangyo Co. and were pulverized for 3 minutes. The obtained powder was passed through a mesh of a perforation size of 500 μm.

Evaluating the Hydrolysable Capability;

50 Milligrams of the powder obtained by the above freeze pulverization and 10 ml of distilled water were put into a vial which was then stored still in an oven maintained at 70° C. for 7 days. The initial sample and the sample after 7 days have passed were measured for their weight average molecular weights Mw, and the ratio of retaining the weight average molecular weight Mw was found from the following formula, Ratio of retaining the weight average molecular weight=(weight average molecular weight after 7 days/initial weight average molecular weight)×100

The lower the retaining ratio, the higher the hydrolysable capability.

Measuring the Crystallinity of the PLA;

Apparatus: DSC 6220 (differential scanning calorimeter) manufactured by Seiko Instruments Co.

Adjusting the sample: amount of sample, 5 to 10 mg

Measuring Conditions:

Measured in a nitrogen atmosphere in a range of 0° C. to 250° C. while elevating the temperature at a rate of 10° C./min.

Crystallinity: Fusion enthalpy ΔHm was found, and the crystallinity was found from the following formula, Xc= (ΔHm−ΔHc)×100/93.6 (J/g).

Measuring the Molecular Weight;
- Apparatus: gel permeation chromatograph GPC
- Detector: differential refractive index detector RI
- Column: Shodex manufactured by Showa Denko Co. HFIP-LG (one unit), HFIP-806M (two units)
- Solvent: hexafluoroisopropanol
- (5 mM sodium trifluoroacetate is added)
- Flow rate: 0.5 mL/min.
- Column temperature: 40° C.

Preparation of Samples:

5 Milliliters of a solvent was added to about 1.5 mg of the sample, and the mixture thereof was mildly stirred at room temperature (sample concentration of about 0.03%). After having confirmed with the eye that the sample had been dissolved therein, the mixture was filtered using a 0.45 μm filter. All of the samples were measured within about one hour from the start of their preparation. A polymethyl methacrylate was used as the standard.

Determination of the Lactic Acid in the Aqueous Solution;
- Apparatus: GULLIVER Series manufactured by JASCO Co.
- Column: Atlantis dC18 manufactured by Wasters Co., 5 μm, 4.6×250 mm
- Detection wavelength: UV absorption of 210 nm
- Solvent: A gradient was imparted with 0.5% phosphoric acid and methanol.
- Flow rate: 1 mL/min.
- Measuring temperature: 40° C.

Example 1

Sample pellets were prepared by using 100 parts by weight of a polylactic acid (Revode 101) and 3 parts by weight of a synthetic mica as the blending agent in compliance with the method mentioned above.

The pellets were calculated for their crystallinity, and were evaluated for their ratio of pass through the mesh after they have been freeze-pulverized and for their hydrolysable capability. The results were as shown in Table 1.

Example 2

Sample pellets were prepared in quite the same manner as in Example 1 but using, as the blending agent, 3 parts by weight of a montmorillonite that has been treated to be swollen, and were evaluated. The results were as shown in Table 1. Pulverizability at normal temperature was also examined. FIG. 1 is a SEM photograph of the obtained powder.

Example 3

Sample pellets were prepared in quite the same manner as in Example 1 but using, as the blending agents, 3 parts by weight of the monmrillonite that has been treated to be swollen and 5 parts by weight of the PEOx, and were evaluated. The results were as shown in Table 1.

Example 4

Figure 2:
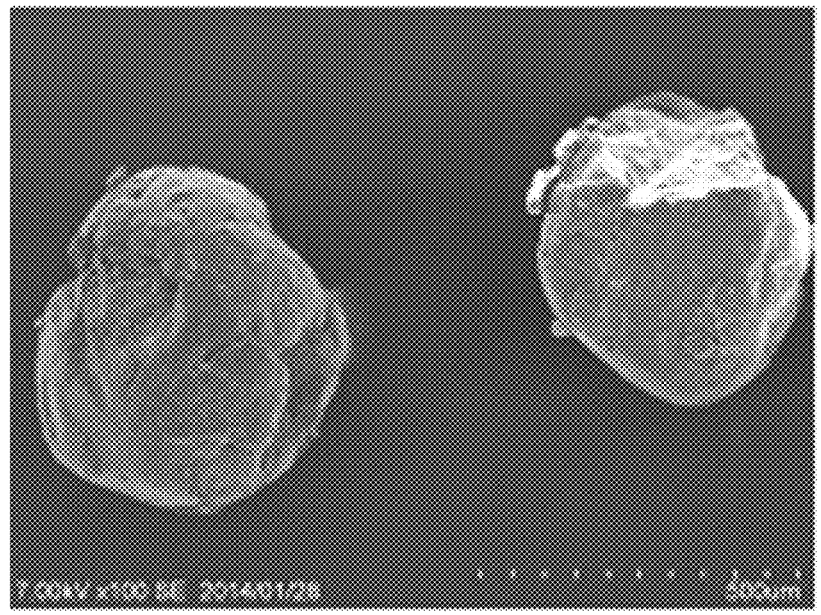
FIG. 2 is an SEM photograph (magnification of 100 times) showing granules obtained by pulverizing, at normal temperature, a polylactic acid composition of the present invention prepared in Example 4.

Sample pellets were prepared in quite the same manner as in Example 1 but using, as the blending agents, 3 parts by weight of the monmrillonite that has been treated to be swollen and 3 parts by weight of magnesium stearate, and were evaluated. The results were as shown in Table 1. Pulverizability at normal temperature was also examined. FIG. 2 is a SEM photograph of the obtained powder.

Example 5

Sample pellets were prepared in quite the same manner as in Example 1 but using, as the blending agents, 3 parts by weight of the monmrillonite that has been treated to be swollen and 5 parts by weight of the magnesium stearate, and were evaluated. The results were as shown in Table 1.

Example 6

Sample pellets were prepared in quite the same manner as in Example 1 but effecting no crystallization treatment and using, as the blending agent, 10 parts by weight of the monmrillonite that has been treated to be swollen, and were evaluated. The results were as shown in Table 1.

Figure 3:
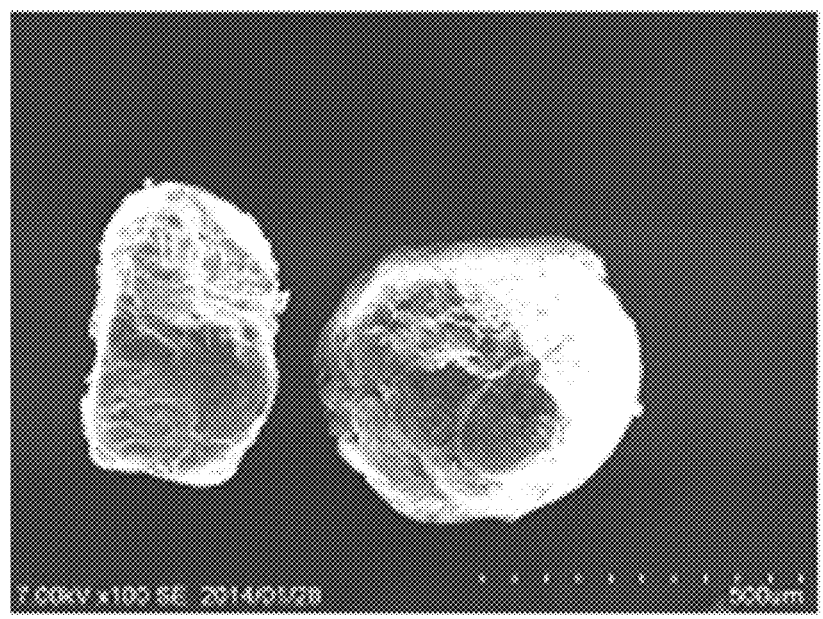
FIG. 3 is an SEM photograph (magnification of 100 times) showing granules obtained by pulverizing, at normal temperature, a polylactic acid composition of the present invention prepared in Example 6.

Pulverizability at normal temperature was also examined. FIG. 3 is a SEM photograph of the obtained powder.

Example 7

Sample pellets were prepared in quite the same manner as in Example 1 but using, as the blending agent, 3 parts by weight of a cellulose CP, and were evaluated. The results were as shown in Table 1.

Comparative Example 1

Sample pellets were prepared in quite the same manner as in Example 1 but using, as the polylactic acid, the Revode 190 manufactured by ZHEJIANG HISUN BIOMATERIALS Co. and using no blending agent, and were evaluated. The results as shown in Table 1. Here, the pass ratio of pulverizability was 0% as shown in Table 1. For evaluating the hydrolysable capability, therefore, use was made of a powder that was passed through the mesh many times after it has been freeze pulverized.

Comparative Example 2

Sample pellets were prepared in quite the same manner as in Example 1 but using no blending agent, and were evaluated. The results were as shown in Table 1.

Comparative Example 3

Sample pellets were prepared in quite the same manner as in Example 1 but using, as the blending agent, 3 parts by weight of a calcium carbonate, and were evaluated. The results were as shown in Table 1.

Comparative Example 4

Sample pellets were prepared in quite the same manner as in Example 1 but using, as the blending agent, 3 parts by weight of an untreated montmorillonite, and were evaluated. The results were as shown in Table 1.

Comparative Example 5

Sample pellets were prepared in quite the same manner as in Example 1 but using, as the blending agent, unmodified cellulose, and were evaluated. The results were as shown in Table 1.

The above evaluated results are shown in Table 1 below.

FIGS. 1, 2 and 3 are SEM, photographs (magnification of 100 times) of the granules obtained by pulverizing at normal temperature the sample pellets obtained in Examples 2, 4 and 6. These granules all possessed the ratios of the smallest diameter/largest diameter of not less than 0.5, i.e., possessed shapes close to a spherical shape.

TABLE 1

|  | Blending agent | (1) | (2) | (3) | (4) |
|---|---|---|---|---|---|
| Example 1 | Synthetic mica | 3 | 28 | 53 | 25 |
| Example 2 | Montmorillonite treated to swell | 3 | 38 | 24 | 14 |
| Example 3 | Montmorillonite treated to swell | 10 | 5 | 46 | — |
| Example 4 | Montmorillonite treated to swell | 3 | 26 | 44 | 11 |
| Example 5 | Magnesium stearate Montmorillonite treated to swell Magnesium stearate | 3 1.5 1.5 | 22 | 21 | 13 |
| Example 6 | Cellulose CP | 3 | 32 | 16 | 9 |
| Example 7 | Montmorillonite treated to swell PEOx | 3 5 | 28 | 18 | 16 |
| Comp. Ex. 1 | — | | 0 | 43 | 0 | 48 |
| Comp. Ex. 2 | — | | 0 | 34 | 0 | — |
| Comp. Ex. 3 | Calcium carbonate | 3 | 26 | 0 | — |
| Comp. Ex. 4 | Untreated montmorillonite | 3 | 27 | 1 | 25 |
| Comp. Ex. 5 | Untreated cellulose | 5 | 41 | 0 | — |

(1) Amount of blending agent (pts. by wt.)
(2) Crystallinity (%)
(3) *Pass ratio of pulverization (%) *Pass ratio of pulverization is a one-pass value of freeze pulverization.
(4) Hydrolysable capability Mw retaining ratio (%)

<Applied Experiment 1>

Evaluating the Dispersion of Montmorillonite;

By using a hot press, pellets obtained in Examples 2 and 4 were formed into films. Distances among the layers of montmorillonite in the obtained films were measured by using a wide angle X-ray diffractometer to evaluate the dispersion property.

The wide angle X-ray diffractometer was the Rad-rB manufactured by Rigaku Co. The X-ray was a CuKα-ray, and the output was 40 kV, 140 mA. The distance among the layers was found according to the Bragg's formula, $$d = n\lambda/2 \sin \theta$$

The montmorillonite treated to be swollen and added to the PLA, too, was measured for a distance among the layers. The results were as described below.

Distance among the layers of the montmorillonite treated to be swollen: 1.8 nm

Distance among the layers of the pellet of Example 2: 3.4 nm

Distance among the layers of the pellet of Example 4: no peak was detected (basic layer had been completely peeled off)

In the present invention from the above experimental results, the distance among the basic three layers of the montmorillonite had been widened as it was added to the polylactic acid. It is, therefore, learned that the montmorillonite had been finely dispersed in the polylactic acid. In Example 4, further, the layers had been completely peeled off, and the montmorillonite had been more dispersed than in Example 2. It is, therefore, considered that the blending agent had been further pulverized (i.e., pass ratio was large) in Example 4.

<Applied Experiment 2>
Evaluating the Hydrolysability Depending on the Crystallinity;

Into a vial were introduced 10 mL of a 60 mM phosphoric acid buffer solution, a CLE enzyme solution, the crystallized powder of Example 2 and a powder that has not been crystallized each in an amount of 50 mg. The mixture was shaken at 45° C. at 100 rpm and after 7 days have passed, the lactic acid in the aqueous solution was determined.

The results were as follows:

|  |  | Crystallinity | Lactic acid concentration |
|---|---|---|---|
| Example 2 | (crystallized) | 38% | 2.5 mg/ml |
| Example 2 | (not crystallized) | 0% | 3.5 mg/ml |

From the above results, the crystallinity affects the hydrolysable capability. The present invention makes it possible to obtain a polylactic acid in a powdery form having a low crystallinity which provides excellent hydrolysable capability.

The invention claimed is:

1. A mechanically pulverized material of a polylactic acid composition using, as a matrix, a polylactic acid having a crystallinity of not more than 40%, the matrix containing a pulverization promotor dispersed therein, wherein:
   said pulverized material is a granular material having a grain size of not more than 300 μm, the granules therein having ratios of the smallest diameter/largest diameter of not less than 0.5,
   said pulverization promotor is a lamellar silicate that is swollen or that is treated to be swollen, and is contained in an amount of 1 to 10 parts by weight per 100 parts by weight of said polylactic acid,
   said polylactic acid composition is a melt-kneaded product of the polylactic acid and the pulverization promotor,
   said polylactic acid has a crystallinity of not less than 5%, and
   a surface of said lamellar silicate that is swollen or that is treated to be swollen is treated with a salt of a fatty acid selected from the group consisting of a Ca salt, a Zn salt, a Mg salt or a Ba salt of a fatty acid.

2. The mechanically pulverized material of a polylactic acid composition as claimed in claim 1, wherein as the polylactic acid, use is made of a DL-isomer in which an L-isomer and a D-isomer are contained at a weight ratio (L/D) in a range of 98/2 to 2/98.

3. The mechanically pulverized material of a polylactic acid composition as claimed in claim 1, wherein the lamellar silicate that is the pulverization promotor is a montmorillonite in which organic cations are introduced.

4. The mechanically pulverized material of a polylactic acid composition as claimed in claim 1, wherein the polylactic acid composition is used for the preparation of an aqueous dispersion solution for drilling.

5. The mechanically pulverized material of a polylactic acid composition as claimed in claim 1, wherein the polylactic acid and the pulverization promotor are melt-kneaded at a temperature not lower than a melting point of the polylactic acid.

6. The mechanically pulverized material of a polylactic acid composition as claimed in claim 1, wherein said polylactic acid has a crystallinity of from 5 to 38%.

7. The mechanically pulverized material of a polylactic acid composition as claimed in claim 1, wherein a surface of said lamellar silicate that is swollen or that is treated to be swollen is treated with a salt of a fatty acid selected from the group consisting of a Ca salt, a Zn salt, a Mg salt or a Ba salt of stearic acid, palmitic acid or lauric acid.

8. The mechanically pulverized material of a polylactic acid composition as claimed in claim 1, wherein the pulverization promotor comprises a lamellar silicate that is treated to be swollen.

9. The mechanically pulverized material of a polylactic acid composition as claimed in claim 8, wherein a surface of said lamellar silicate that is treated to be swollen is treated with a salt of a fatty acid selected from the group consisting of a Ca salt, a Zn salt, a Mg salt or a Ba salt of stearic acid, palmitic acid or lauric acid.

* * * * *